US008762545B2

(12) United States Patent
Li

(10) Patent No.: US 8,762,545 B2
(45) Date of Patent: Jun. 24, 2014

(54) NETWORK DATA SHARING SYSTEM FOR SHARING MULTIMEDIA DATA ON NETWORK AND HANDHELD ELECTRONIC DEVICE THEREOF

(75) Inventor: Fan Li, Shanghai (CN)

(73) Assignees: Inventec Appliances (Shanghai) Co., Shanghai (CN); Inventec Appliances Corp Ltd., New Taipei (TW)

( * ) Notice: Subject to any disclaimer, the term of this patent is extended or adjusted under 35 U.S.C. 154(b) by 231 days.

(21) Appl. No.: 13/184,544

(22) Filed: Jul. 17, 2011

(65) Prior Publication Data

US 2012/0054352 A1 Mar. 1, 2012

(51) Int. Cl.
*G06F 15/16* (2006.01)

(52) U.S. Cl.
USPC .......................................... 709/227; 709/246

(58) Field of Classification Search
None
See application file for complete search history.

(56) References Cited

U.S. PATENT DOCUMENTS

| | | | |
|---|---|---|---|
| 7,010,581 B2* | 3/2006 | Brown et al. | 709/218 |
| 7,127,745 B1* | 10/2006 | Herse et al. | 726/30 |
| 7,992,187 B2* | 8/2011 | Chiao | 725/153 |
| 8,565,843 B1* | 10/2013 | Lugo | 455/575.4 |
| 2005/0060411 A1* | 3/2005 | Coulombe et al. | 709/227 |
| 2005/0132264 A1* | 6/2005 | Joshi et al. | 715/500.1 |
| 2008/0284907 A1* | 11/2008 | Chiao | 348/448 |
| 2010/0192186 A1* | 7/2010 | Margulis | 725/81 |

* cited by examiner

*Primary Examiner* — Brian P Whipple
(74) *Attorney, Agent, or Firm* — Che-Yang Chen; Law Office of Michael Chen

(57) ABSTRACT

A network data sharing system includes a service device configured to access a network and at least one handheld electronic device configured to play data. The service device includes a service computing unit configured to encode data and a service transmission module for accessing a network. The handheld electronic device includes a terminal computing unit configured to decode data, a screen and a terminal transmission interface. When the handheld electronic device is connected to the service device through the terminal transmission interface, the handheld electronic device is configured to instruct the service device to access multimedia data on the network, the service computing unit is configured to encode the accessed multimedia data into encoded multimedia data, which the terminal computing unit of the handheld electronic device is configured to decode, and the handheld electronic device is configured to play, or display through the screen, the decoded multimedia data.

12 Claims, 3 Drawing Sheets

NETWORK DATA SHARING SYSTEM FOR SHARING MULTIMEDIA DATA ON NETWORK AND HANDHELD ELECTRONIC DEVICE THEREOF

BACKGROUND OF THE INVENTION

1. Field of the Invention

The present invention relates to a data sharing system, and more particularly to a network data sharing system for sharing multimedia data on a network, and a handheld electronic device thereof.

2. Brief Description of the Related Art

As the technologies related to personal multimedia players, storage devices and high definition (HD) displays advance, multimedia data over 10 G or even 1 T are transmitted via networks, but the huge data flow creates the issues of managing and sharing resources. At present, the sharing mechanism primarily uses the operation of folders in computer systems for the management, and external televisions or display devices of the computer systems for playing the multimedia data, or shares resources of a network through a television with a networking online function. A code conversion program on a general computer is used to convert the multimedia data to a format (such as MP4) supported by an external palm device in order to share the multimedia data with the external palm device, and output the multimedia data to the external palm device for a display. However, such arrangement has the drawbacks of taking much time and wasting storage resources.

The code conversion speed depends on the computability of the computer systems, but it still takes time in most cases. For example, an average mid-priced computer system takes approximately one hour to convert a two-hour movie. As to the storage resource, the palm device generally reserves more storage spaces for storing the original multimedia file, since the code conversion is required for playing a movie in the MP4 format on the palm device, but the effects (including the screen quality and sound effect) of the original multimedia data is better than the format-converted file, and the original multimedia files are saved for the possibility of an upgraded palm device in the future. In other words, more storage spaces are consumed. Furthermore, there are various kinds of palm devices, and the formats for playing the multimedia data are different, and thus it is necessary to convert the multimedia files into different formats for the different palm devices.

SUMMARY OF THE INVENTION

Therefore, it is an objective of the present invention to provide a network data sharing system for sharing multimedia data on a network. The network data sharing system comprises a service device with a function of accessing a network, and at least one handheld electronic device configured to connect to the service device and with a function of playing multimedia data. The service device comprises a service computing unit configured to encode multimedia data, and a service transmission module electrically coupled to the service computing unit for accessing the network. The handheld electronic device comprises a terminal computing unit configured to decode multimedia data, a screen electrically coupled to the terminal computing unit, and a terminal transmission interface electrically coupled to the terminal computing unit and configured to connect to the service transmission module of the service device. When the handheld electronic device is connected to the service device through the terminal transmission interface, the handheld electronic device is configured to instruct the service device to access multimedia data on the network through the service transmission module. The service computing unit is configured to encode the accessed multimedia data into encoded multimedia data, which the terminal computing unit of the handheld electronic device is configured to decode, and the handheld electronic device is configured to play, or display through the screen, the decoded multimedia data.

In an embodiment of the present invention, the service device further comprises a video output module electrically coupled to the service computing unit and provided for connecting to an external display device to play or display the accessed multimedia data.

In another embodiment of the present invention, the service transmission module further comprises a cable transmission unit and a wireless transmission unit.

In another embodiment of the present invention, the handheld electronic device further comprises an input unit electrically coupled to the terminal computing unit for inputting or giving an instruction.

In another embodiment of the present invention, the screen further has a touch input unit electrically coupled to the terminal computing unit, and the touch input unit is configured to operate in coordination with a displayed frame on the screen to constitute a user interface for inputting or giving an instruction to the handheld electronic device through touch control.

In another embodiment of the present invention, the handheld electronic device further comprises a storage device electrically coupled to the terminal computing unit and provided for storing multimedia data.

In another embodiment of the present invention, the handheld electronic device further comprises a data transmission interface electrically coupled to the terminal computing unit and provided for connecting to an external storage device for the multimedia data output from the handheld electronic device.

In another embodiment of the present invention, the terminal transmission interface is configured to connect to the service transmission module through the network. Further, the handheld electronic device and the service device may be configured to cooperate under a control protocol so as to allow only the handheld electronic device to instruct or share the multimedia data with the service device.

In another embodiment of the present invention, the control protocol comprises a Virtual Network Computing (VNC) remote control protocol.

The present invention also provides a handheld electronic device for sharing multimedia data on a network. The handheld electronic device is configured to connect to at least one service device and comprises a terminal computing unit configured to decode multimedia data; a screen electrically coupled to the terminal computing unit; and a terminal transmission interface electrically coupled to the terminal computing unit and configured to connect to the service device. When the handheld electronic device is connected to the service device by the terminal transmission interface, the handheld electronic device is configured to instruct the service device to access multimedia data on the network. The service device is configured to encode the accessed multimedia data into encoded multimedia data, which the terminal computing unit of the handheld electronic device is configured to decode, and the handheld electronic device is configured to play, or display through the screen, the decoded multimedia data.

In summary, the network data sharing system of the present invention allows users to share multimedia data on the network easily. The direct conversion between different formats of the multimedia data enables playing or displaying the multimedia data at different devices and by various different ways, and can save data file conversion time and storage space. And service devices and handheld electronic devices can be connected with one another to achieve maximum use and resources sharing.

BRIEF DESCRIPTION OF THE INVENTION

The above objectives and other technical characteristics and advantages of the present invention will be apparent with the detailed description of the preferred embodiment with the illustration of related drawings as follows.

DETAILED DESCRIPTION OF THE PREFERRED EMBODIMENTS

A preferred embodiment of the invention is a network data sharing system for sharing multimedia data on a network, comprising at least one service device and at least one handheld electronic device used to connect to the service device. The service device comprises a service computing unit configured to encode multimedia data; and a service transmission module electrically coupled to the service computing unit for accessing the network. The handheld electronic device comprises a terminal computing unit configured to decode multimedia data; a screen electrically coupled to the terminal computing unit; and a terminal transmission interface electrically coupled to the terminal computing unit and configured to connect to the service transmission module of the service device. When the handheld electronic device is connected to the service device by the terminal transmission interface, the handheld electronic device is configured to instruct the service device to access multimedia data on the network through the service transmission module; the service computing unit is configured to encode the accessed multimedia data into encoded multimedia data, which the terminal computing unit is configured to decode, and the handheld electronic device is configured to play, or display through the screen, the decoded multimedia data. It must be noted that the term "multimedia data" used in the present disclosure broadly means data that can be used in any one of various relevant applications using, involving, or encompassing one or several media. And the term "network" used in the present disclosure broadly encompasses any type of information, computer, or mobile communication network that can be compatible with the invention, according to opinion of one of skill in the art.

Figure 1:
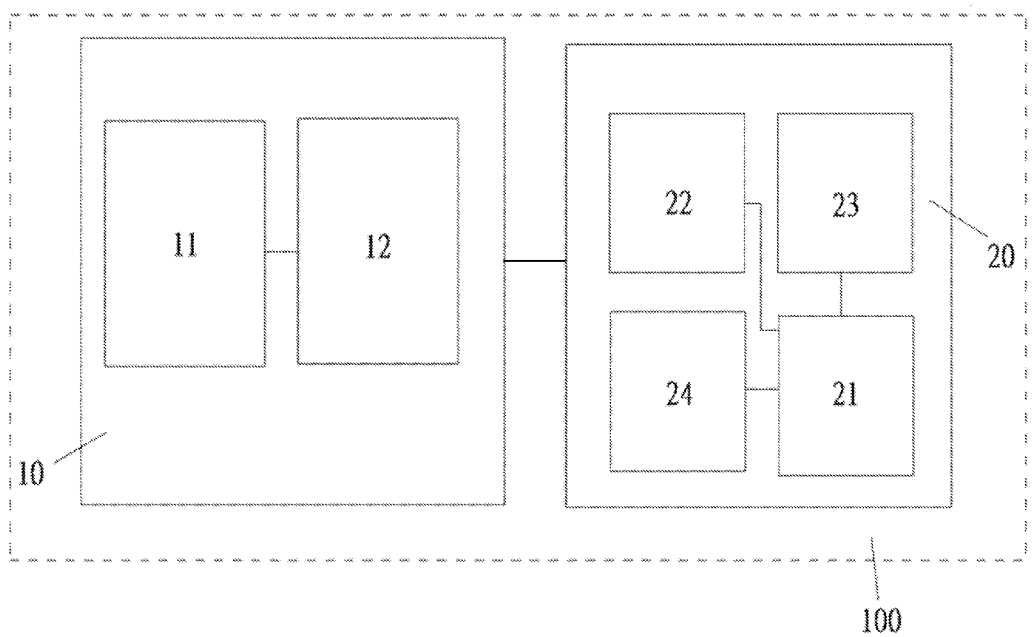
FIG. 1 shows a functional block diagram of a network data sharing system in accordance with an embodiment of the present invention.

With reference to FIG. 1 showing a functional block diagram of a network data sharing system in accordance with an embodiment of the present invention, the network data sharing system 100 comprises a service device 10 and a handheld electronic device 20. The service device 10 comprises a service computing unit 11 and a service transmission module 12, wherein the service computing unit 11 is electrically coupled to the service transmission module 12. The handheld electronic device 20 comprises a terminal computing unit 21, a screen 22, a terminal transmission interface 23 and an input unit 24, wherein the screen 22, the terminal transmission interface 23 and the input unit 24 are electrically coupled to the terminal computing unit 21. The service computing unit 11 of the service device 10 may have functions of encoding multimedia data in widely used e.g. TS, VOB, MKV, RMVB, MP4, AVI, JPG, TIF, BMP, WMV and GIF video formats. The service computing unit 11 may also have functions of decoding multimedia data, and the functions of encoding or decoding may be realized by hardware in the service computing unit 11. The service transmission module 12 comprises a cable transmission unit and a wireless transmission unit, so the service device 10 is able to access the Internet through cable transmission (such as USB, Ethernet, ADSL, and so on) or wireless transmission (such as WLAN, Bluetooth, 3G, Zigbee, etc.) to search for user's desired multimedia data on the Internet or share multimedia resources (in AFP, SMB, Windows network Disk, NFS, or ZFS format).

In FIG. 1, the terminal computing unit 21 of the handheld electronic device 20 is configured to play multimedia data and has the function of decoding images in specific formats, such as TS, VOB, MKV, RMVB, MP4, AVI, JPG, TIF, BMP, WMV and GIF formats. The screen 22 may be an LCD screen with a size from 5 inches to 15 inches and is preferably designed to facilitate the use of being handheld. The terminal transmission interface 23 may be connected to the service transmission module 12 by a wireless transmission via a network or a direct connection. The input unit 24 may be in a form of a physical keyboard or combined with a displayed frame on the screen 22 to provide a graphical user interface (GUI) which uses touch input method, such that a user can input to give instructions, such as pause, play, zoom in, zoom out, and move the played multimedia data by operating and controlling the handheld electronic device 20 through the input unit 24, or can control the service device 10 to search for network multimedia data and perform related transmission functions.

When the user wants to view multimedia data, the user may input to give an instruction from the input unit 24 of the handheld electronic device 20. Then, the given instruction is transmitted to the service computing unit 11 through the terminal computing unit 21, the terminal transmission interface 23 and the service transmission module 12 of the service device 10 for processing. The service computing unit 11 then follows the instruction to instruct the service transmission module 12 to execute the function of accessing the network to access multimedia data on the network. When the multimedia data are obtained by the service device 10, the service computing unit 11 will encode (maybe after a step of decoding) the multimedia data according to the format in which data can be decoded by the terminal computing unit 21. If the original format of the multimedia data is the format in which data can be decoded by the terminal computing unit 21, then it will not be necessary to perform the encoding by the service computing unit 11 first. Then, the service transmission module 12 returns the multimedia data to the handheld electronic device 20 and the screen 22 plays or displays the multimedia data. Then the multimedia data may also be returned in streams, such that the handheld electronic device 20 can play and return the multimedia data at the same time.

Figure 2:
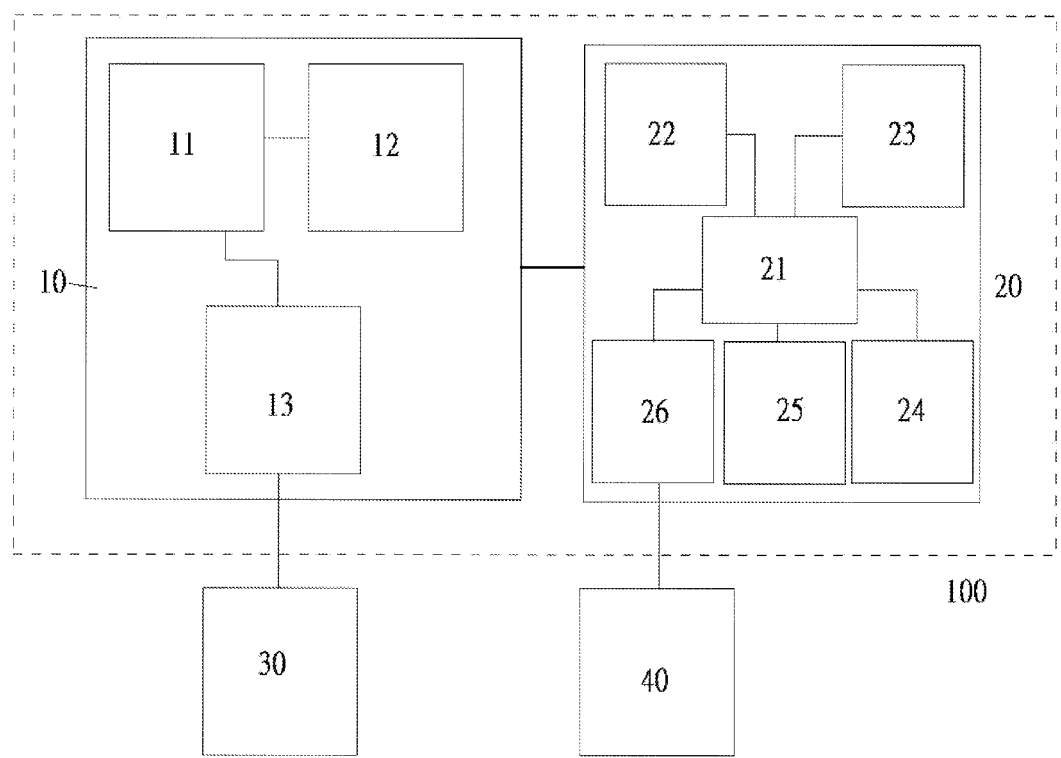
FIG. 2 shows a functional block diagram of a network data sharing system in accordance with another embodiment of the present invention.

With reference to FIG. 2 showing a functional block diagram of a network data sharing system in accordance with another preferred embodiment of the present invention, same numerals are used for same respective elements. In FIG. 2, the network data sharing system 100 comprises a service device 10 and a handheld electronic device 20. The service device 10 comprises a service computing unit 11, a service transmission module 12 and a video output module 13, wherein the service transmission module 12 and the video output module 13 are electrically coupled to the service computing unit 11. The handheld electronic device 20 comprises a terminal computing unit 21, a screen 22, a terminal transmission interface 23, an input unit 24, a storage device 25 and a data transmission interface 26, wherein the screen 22, the terminal transmission interface 23, the input unit 24, the storage device 25 and the data transmission interface 26 are electrically coupled to the terminal computing unit 21. The service computing unit 11 of the service device 10 may have functions of encoding multimedia data in e.g. TS, VOB, MKV, RMVB, MP4, AVI, JPG, TIF, BMP, WMV and GIF formats. The service computing unit 11 may also have functions of decoding multimedia data in e.g. the aforementioned formats, and the functions of encoding or decoding may be realized by hardware in the service computing unit 11. The service transmission module 12 comprises a cable transmission unit and a wireless transmission unit, so the service device 10 can access the Internet through cable transmission (such as USB, Ethernet and ADSL) or wireless transmission (such as WLAN, Bluetooth, 3G and Zigbee) to search user's desired multimedia data on the network, or share multimedia resources (in AFP, SMB, Windows network Disk, NFS or ZFS format). The video output module 13 is provided for connecting to an external display device 30 to play the multimedia data from the external display device 30 directly. The video output module 13 may be one of different types such as D-SUB, AV terminal, component video connector or display port, and the external display device 30 may be one of different types of display devices.

In FIG. 2, the terminal computing unit 21 of the handheld electronic device 20 is configured to play the multimedia data and has the function of decoding images in specific formats such as TS, VOB, MKV, RMVB, MP4, AVI, JPG, TIF, BMP, WMV and GIF formats. The screen 22 may be an LCD screen with a size from 5 inches to 15 inches, and is preferably designed to facilitate the use of being handheld. The terminal transmission interface 23 may be connected to the service transmission module 12 by using the wireless transmission via a network or a direct connection. The input unit 24 may be in a form of a physical keyboard or combined with a screen 22 to provide a touch input method through the graphical user interface (GUI), so that users can input to give different instructions (such as pause, play, zoom in, zoom out, and move) to the handheld electronic device 20 to play the multimedia data by inputting the instructions from the input unit, or can control the service device 10 to search for network multimedia data and perform related transmission functions. The storage device 25 may be a traditional hard disk, solid state disk, or one of various different storage cards, so that the handheld electronic device 20 can have the function of storing multimedia data. The data transmission interface 26 is provided for connecting to an external storage device 40, so that the handheld electronic device 20 can transmit multimedia data to the storage device 40 when there is no storage space or the storage space is insufficient.

When a user wants to view multimedia data, the user may input to give an instruction from the input unit 24 of the handheld electronic device 20 first. Then, the given instruction is transmitted to the service computing unit 11 for processing, through the terminal computing unit 21, the terminal transmission interface 23, and the service transmission module 12 of the service device 10. The service computing unit 11 then follows the instruction to instruct the service transmission module 12 to access the network and the multimedia data on the network. When the service device 10 obtains the multimedia data and the user wants to use a general household external display device 30 to view the multimedia data, the user can connect the video output module 13 with the external display device 30 directly, so that the external display device 30 can play the multimedia data. Otherwise, the service computing unit 11 will encode (maybe after a step of decoding) the multimedia data according to the format in which data can be decoded by the terminal computing unit 21. If the original format of the multimedia data is the format in which data can be decoded by the terminal computing unit 21, then the encoding by the service computing unit 11 is not required. Then, the service transmission module 12 returns the multimedia data to the handheld electronic device 20. Then, the user can selectively play or display the multimedia data by the screen 22 directly or store the multimedia data into the storage device 25 or transmit the multimedia data to an external storage device 40 through the data transmission interface 26.

Figure 3:
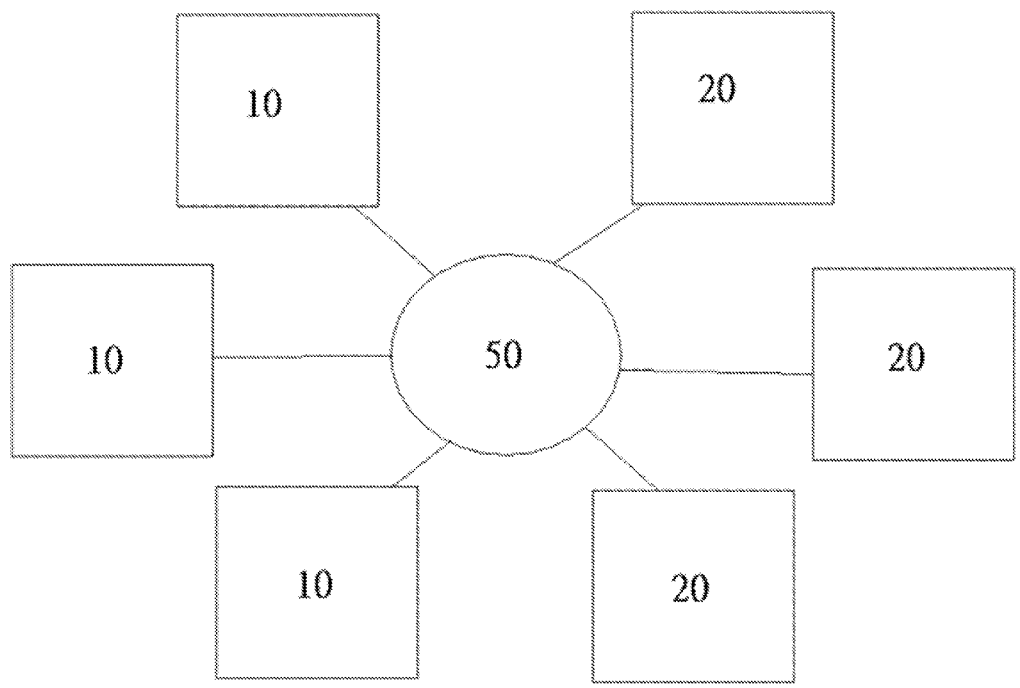
FIG. 3 shows a functional block diagram of a network data sharing system in accordance with another embodiment of the present invention.

With reference to FIG. 3 showing a schematic block diagram of a network data sharing system in accordance with another preferred embodiment of the present invention, the network data sharing system in practice may comprise a plurality of service devices 10 and a plurality of handheld electronic devices 20, which are connected to one another by a network 50 to achieve maximum use and benefit. The network data sharing system may further have a control protocol (such as the VNC remote control protocol) to prevent any device other outside the network data sharing system to access, instruct, or share resources of the service device 10.

Another preferred embodiment of the invention is a handheld electronic device for sharing multimedia data on a network. The handheld electronic device is configured to connect to at least one service device and comprises a terminal computing unit configured to decode multimedia data; a screen electrically coupled to the terminal computing unit; and a terminal transmission interface electrically coupled to the terminal computing unit and configured to connect to the service device. Further, when the handheld electronic device is connected to the service device by the terminal transmission interface, the handheld electronic device is configured to instruct the service device to access multimedia data on the network; the service device is configured to encode the accessed multimedia data into encoded multimedia data, which the terminal computing unit is configured to decode, and the handheld electronic device is configured to play, or display through the screen, the decoded multimedia data.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A network data sharing system for sharing multimedia data on a network, comprising:
   at least one service device, comprising:
      a service computing unit configured to encode multimedia data; and
      a service transmission module electrically coupled to the service computing unit for accessing the network; and
   at least one handheld electronic device configured to connect to the service device, the handheld electronic device comprising:
      a terminal computing unit configured to decode multimedia data;
      a screen electrically coupled to the terminal computing unit; and
      a terminal transmission interface electrically coupled to the terminal computing unit and configured to connect to the service transmission module of the service device through the network;

wherein when the handheld electronic device is connected to the service device by the terminal transmission interface, the handheld electronic device is configured to instruct the service device to access multimedia data on the network through the service transmission module;

the service computing unit is configured to encode the accessed multimedia data into encoded multimedia data, which the terminal computing unit is configured to decode, and the handheld electronic device is configured to play, or display through the screen, the decoded multimedia data;

wherein the service computing unit is further configured to compare a format of the accessed multimedia data with a format in which data can be decoded by the terminal computing unit before the service computing unit encodes the accessed multimedia data; and if the accessed multimedia data have a format in which data can be decoded by the terminal computing unit, the service computing unit will not encode the accessed multimedia data;

wherein the handheld electronic device and the service device are configured to cooperate under a control protocol so as to allow only the handheld electronic device to instruct or share the multimedia data with the service device;

wherein the control protocol comprises a Virtual Network Computing (VNC) remote control protocol.

2. The network data sharing system of claim 1, wherein the service device further comprises a video output module electrically coupled to the service computing unit and used to connect to an external display device for playing or displaying the accessed multimedia data.

3. The network data sharing system of claim 1, wherein the service transmission module further comprises a cable transmission unit and a wireless transmission unit.

4. The network data sharing system of claim 1, wherein the handheld electronic device further comprises an input unit electrically coupled to the terminal computing unit and used for inputting or giving an instruction.

5. The network data sharing system of claim 1, wherein the screen further has a touch input unit electrically coupled to the terminal computing unit, and the touch input unit is configured to operate in coordination with a displayed frame on the screen to constitute a user interface for inputting or giving an instruction to the handheld electronic device through touch control.

6. The network data sharing system of claim 1, wherein the handheld electronic device further comprises a storage device electrically coupled to the terminal computing unit for storing the multimedia data.

7. The network data sharing system of claim 1, wherein the handheld electronic device further comprises a data transmission interface electrically coupled to the terminal computing unit and used to connect to an external storage device for the multimedia data output from the handheld electronic device.

8. A handheld electronic device for sharing multimedia data on a network, the handheld electronic device configured to connect to at least one service device and comprising:

a terminal computing unit configured to decode multimedia data;

a screen electrically coupled to the terminal computing unit; and a terminal transmission interface electrically coupled to the terminal computing unit and configured to connect to the service device through the network;

wherein when the handheld electronic device is connected to the service device by the terminal transmission interface, the handheld electronic device is configured to instruct the service device to access multimedia data on the network;

the service device is configured to encode the accessed multimedia data into encoded multimedia data, which the terminal computing unit is configured to decode, and the handheld electronic device is configured to play, or display through the screen, the decoded multimedia data;

wherein the service device is further configured to compare a format of the accessed multimedia data with a format in which data can be decoded by the terminal computing unit before the service device encodes the accessed multimedia data; and if the accessed multimedia data have a format in which data can be decoded by the terminal computing unit, the service device will not encode the accessed multimedia data;

wherein the handheld electronic device is configured to cooperate under a control protocol so as to allow the handheld electronic device to instruct or share the multimedia data with the service device;

wherein the control protocol comprises a Virtual Network Computing (VNC) remote control protocol.

9. The handheld electronic device of claim 8, further comprising an input unit electrically coupled to the terminal computing unit and used for inputting or giving an instruction.

10. The handheld electronic device of claim 8, wherein the screen further has a touch input unit electrically coupled to the terminal computing unit, and the touch input unit is configured to operate in coordination with a displayed frame on the screen to constitute a user interface for inputting or giving an instruction to the handheld electronic device through touch control.

11. The handheld electronic device of claim 8, further comprising a storage device electrically coupled to the terminal computing unit for storing the multimedia data.

12. The handheld electronic device of claim 8, further comprising a data transmission interface electrically coupled to the terminal computing unit and used to connect to an external storage device for the multimedia data output from the handheld electronic device.

* * * * *